June 4, 1946.   S. M. MacNEILLE   2,401,695
RANGE FINDER
Filed June 23, 1943   2 Sheets-Sheet 1
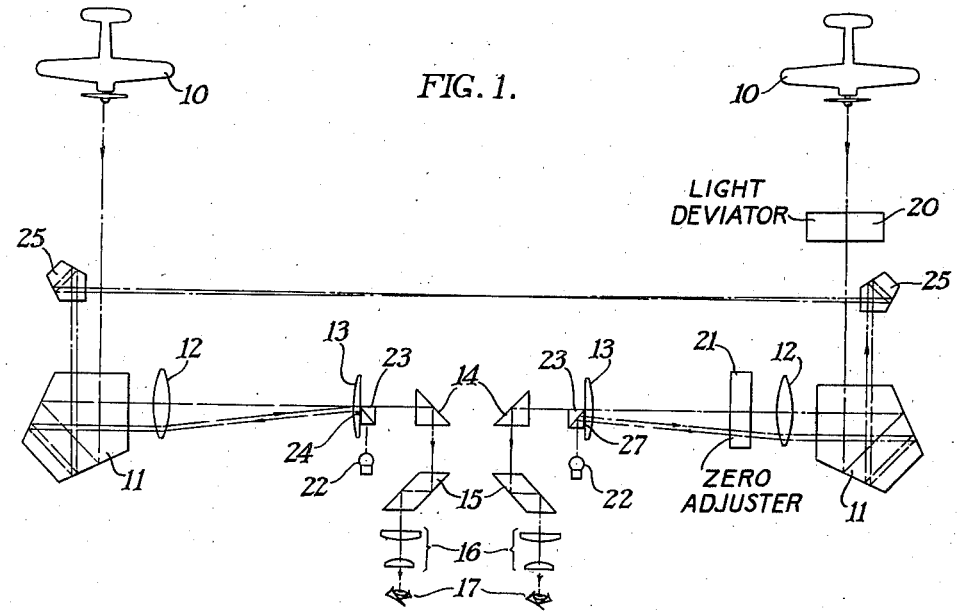
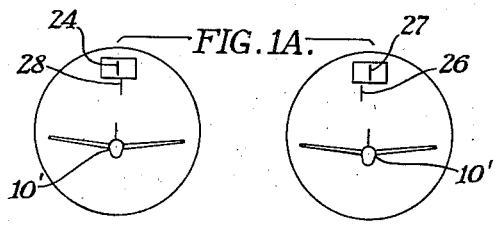
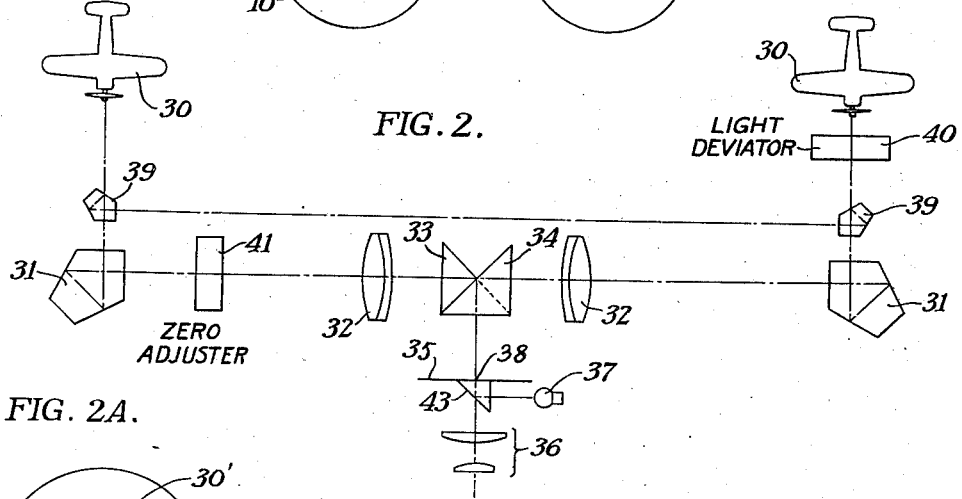
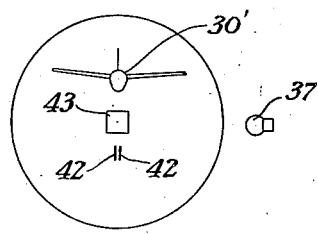
STEPHEN M. MacNEILLE
INVENTOR
BY
ATT'Y & AG'T June 4, 1946.  S. M. MacNEILLE  2,401,695
RANGE FINDER
Filed June 23, 1943   2 Sheets-Sheet 2
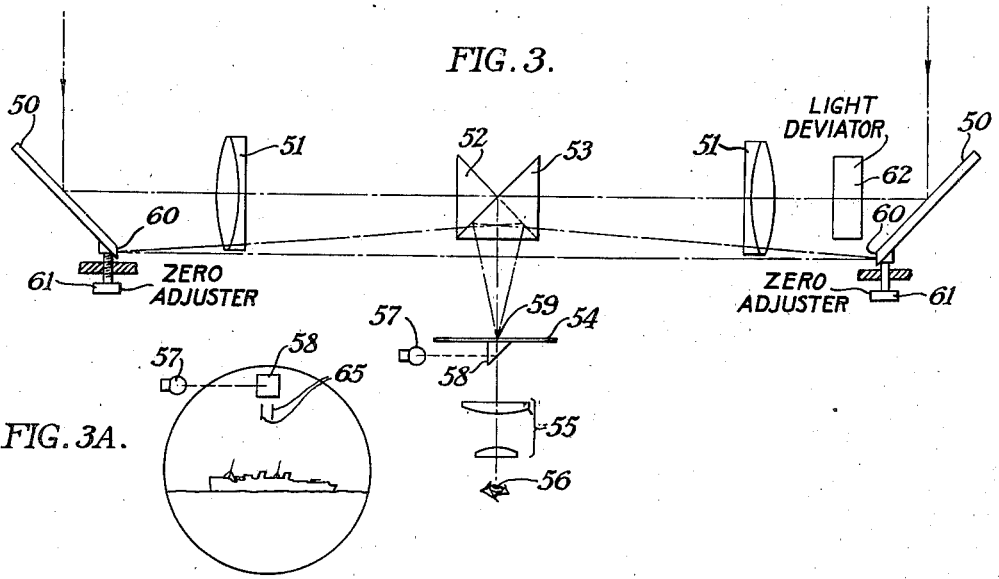
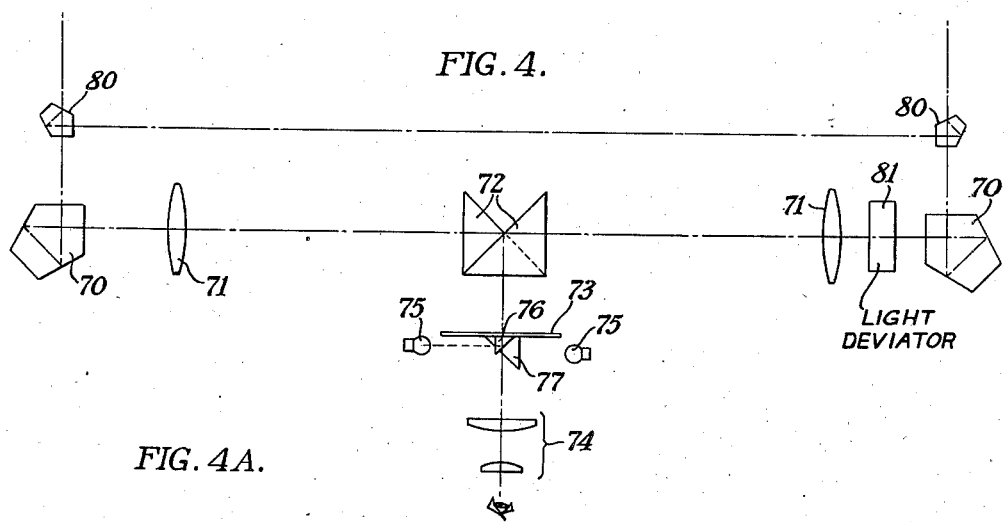
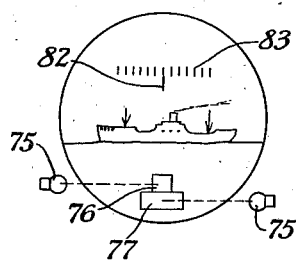
STEPHEN M. MACNEILLE
INVENTOR
BY
ATT'Y & AG'T Patented June 4, 1946

2,401,695

UNITED STATES PATENT OFFICE 2,401,695

RANGE FINDER

Stephen M. MacNeille, Rochester, N. Y., assignor to Eastman Kodak Company, Rochester, N. Y., a corporation of New Jersey Application June 23, 1943, Serial No. 491,954

11 Claims. (Cl. 88—2.7)

This invention relates to range finders. This is Case M of a series of applications relating to the same subject and including the following:

| Title | Serial No. | Filed | Inventors |
|---|---|---|---|
| Mount for optical elements. | 461,584 | Oct. 10, 1942 | Mihalyi. |
| Range finder construction. | 461,585 | Oct. 10, 1942 | Do. |
| Range finders—Case A | 472,831 | Jan. 19, 1943 | Do. |
| Range finders—Case B | 472,832 | Jan. 19, 1943 | Do. |
| Range finders—Case C | 472,833 | Jan. 19, 1943 | Do. |
| Range finders—Case D | 472,834 | Jan. 19, 1943 | Mihalyi, MacNeille. |
| Range finders—Case E | 472,835 | Jan. 19, 1943 | Mihalyi, Tuttle. |
| Range finders—Case F | 479,096 | Mar. 13, 1943 | Mihalyi. |
| Range finders—Case G | 479,097 | Mar. 13, 1943 | Do. |
| Range finders—Case H | 479,098 | Mar. 13, 1943 | Holmes, Mihalyi. |
| Range finders—Case I | 479,099 | Mar. 13, 1943 | Mihalyi, MacNeille. |
| Range finders—Case J | 479,100 | Mar. 13, 1943 | MacNeille, Holmes. |
| Range finders—Case K | 479,101 | Mar. 13, 1943 | Mihalyi, MacNeille. |
| Range finders—Case L | 479,102 | Mar. 13, 1943 | Mihalyi. |
| Range finders—Case M | 491,954 | June 23, 1943 | MacNeille. |
| Range finders—Case N | 491,955 | June 23, 1943 | MacNeille, Mihalyi. |
| Range finders—Case O | 491,956 | June 23, 1943 | MacNeille. |
| Range finders—Case P | 526,020 | Mar. 11, 1944 | Do. |
| Range finders—Case T | 508,186 | Oct. 29, 1943 | Do. |

The present invention is applicable to both pure autocollimation and to range correction setting as described in various of the above listed cases, but is particularly useful with range correction setting systems. It is the primary object of the invention to double the sensitivity of the collimating system.

Preferably the invention is arranged so that a single observer can observe both the object images for ranging and the adjustment coindicant elements or more exactly the images of these elements. One preferred embodiment of the invention applicable to coincidence type range finders uses parts of a single mark as both adjustment coindicant elements in a range correction system.

In the other applications of this series relating to autocollimation including range correction, the light path for the collimator passes effectively through the range finder, but is more stable than the main optical path, mainly by the use of smaller optical elements which are less likely to get out of adjustment. In all of these systems, the collimator target shift caused by an error in the main optical path is of the same magnitude as the real target shift caused by the same error. For many purposes this is, of course, quite satisfactory. However, it requires that the collimator target, i. e., the range coindicant elements, be "read" with the same high order of skill and care used in reading the coincidence or stereo depth of the object images, i. e. of the real target. There is thus a fundamental limitation on the attainable accuracy not only because of the uncertainty in the collimator setting itself but also because of the time required to make this additional setting if the instrument does happen to get out of adjustment. From an academic point of view, whether the collimator is read by the range reader or by another observer, the necessity for two independent observations of equal difficulty makes the final results measurably less reliable than either observation is alone. By the present invention the sensitivity of the range correction setting or other adjustment of the coindicant elements is doubled. With this arrangement the ultimate range reading is for all practical purposes dependent only on the reliability of the range reading.

According to the invention, this double sensitivity is attained by having an adjustment coindicant element or an image thereof (i. e. at least optically) in each of the comparison planes of the range finder and means for projecting through the range finder optical system or its equivalent light from each element to form an image thereof in the other comparison plane. Thus, there are really two element light beams, one going in each direction. Since any error in the optical system affects both of these beams equally, the resultant difference in the element images is twice that of the maladjustment of either image alone. In coincidence range finders, the comparison planes are, of course, coplanar and the resultant element images are brought adjacent to one another. The instrument is in adjustment when the images are in coincidence, but any error in the optical system affects the object images with only half the sensitivity with which it affects these element images.

In stereo range finders, the comparison planes are usually separated and the element images may conveniently be viewed and judged stereoscopically, for example, by comparing the apparent distance of these element images with the apparent distance of the original elements themselves.

As applied to autocollimating systems, a scale is projected from one comparison plane to the other and an index is projected in the opposite direction, the double sensitivity feature allowing a scale twice as large and hence twice as easy to read, to be used. However, the invention is of most practical use with range correcting setting systems in which the element images are brought into coincidence or other fixed relationship by some zero adjusting means independent of the light deviator of the range finder. In range correction setting systems, the light deviator of the range finder must operate on one of the beams of light from the object being ranged but not on either of the element light beams. Also, since the element images are formed in the comparison planes, it is usually convenient to have the same observer watch both the object images and the element images, although, of course, reflectors could be provided for sending the element images into a separate field of view for an auxiliary observer.

In one particularly preferred embodiment of this invention, a coincidence type range finder has a single illuminated mark in the comparison plane, parts of the mark being considered in each of the coplanar comparison planes for the sake of comparison with the more general form of the invention. Light from this mark is projected in both directions around the range finder optical system and from one viewing point to the other so that it is ultimately brought to focus to form two images in the comparison plane. One or more zero adjustors are provided in the optical system to bring these two element images into coincidence when the instrument is in proper calibration. A light deviator for deviating one of the object beams relative to the other is positioned in the range finder optical system, but outside of the path of the element light beams.

Other advantages of the invention will be fully understood from the following description of certain preferred embodiments when read in connection with the accompanying drawings, in which:

Fig. 1 illustrates a stereo range finder incorporating the invention, Fig. 1A being the binocular field of view through the eyepieces of Fig. 1;

Fig. 2 shows a preferred embodiment of the invention incorporated in a coincidence range finder, Fig. 2A being a view through the eyepiece of this instrument;

Fig. 3 illustrates a simplified form of the invention applied to coincidence type of range finders, Fig. 3A being the field of view through the eyepiece of this instrument;

Fig. 4 illustrates the application of the present invention to pure autocollimating range finders, Fig. 4A being the field of view through the eyepiece thereof.

In Fig. 1 light from a distant object represented by two small aeroplanes 10 is received at the viewing points of a range finder and is directed by penta prisms 11 through objectives 12 to form stereo images in comparison planes on the surfaces of field lenses 13. These images are viewed stereoscopically by means of prisms 14, rhombs 15 and eyepieces 16 by the eyes 17 of an observer. The apparent object distant as determined by the object images 10' shown in Fig. 1A is adjusted by a light deviator 20 operating on one of the object beams. This adjustment is continued until the apparent object distance matches that of some reticle mark, for example, the marks 24 and 27. These marks 24 and 27 are in the comparison planes and have an apparent mark distance. According to the invention, these marks are illuminated by lamps 22 and semi-transparent reflectors 23. The marks are, however, visible to the observer through these semi-transparent reflectors 23. Light from the mark 24 is collimated by the objective 12 and directed by the penta prism 11 to an auxiliary penta prism 25 and thence to the other viewing point of the range finder and back into the instrument to be brought to focus to form an image 26 in the other comparison plane. Similarly, the mark 27 sends out light which is brought to focus to form an image 28 in the other comparison plane. The apparent element image distance as produced by the images 26 and 28 is compared with that of the elements 24 and 27 themselves. If the instrument is out of adjustment as indicated by a discrepancy between the apparent element distance and the apparent element image distance, this maladjustment is corrected by means of a light deviator in the form of a zero adjustor 21 which operates on both of the element image beams and on one of the object beams. It will be noted that when the instrument is in proper adjustment for ranging, the apparent element distance, the apparent element image distance and the apparent target distance are all the same.

In Fig. 2 light from a distant object, represented by small aeroplanes 30, is directed by penta prisms 31 and objectives 32 to crossed reflectors 33 and 34 and thence to focus in a comparison plane 35. Coincidence of these images may be adjusted by a light deviator 40 positioned in one of the object beams. The images are viewed through an eyepiece 36. According to the invention, light from a lamp 37 is reflected by a prism 43 which illuminates a single mark 38 which constitutes both of the adjustment coindicant elements. Light from part of this mark is reflected by prism 33 through the objective 32 and by means of penta prism 39 from one point to the other and back through the optical system and prism 34 into focus in the comparison plane 35. Similarly, light from the other part of the mark is reflected first by the prism 34 around through the range finder system and eventually by the prism 33 also into focus forming an image in the comparison plane. These resulting images 42 as seen in Fig. 2A are brought into coincidence by a zero adjustor 41 which also operates on one of the target or object beams to compensate for any maladjustment of the instrument. When this correction is made, the calibration of the light deviator 40 is correct.

In Fig. 3 a somewhat simplified arrangement is described in which the object beams are received by mirrors 50 and focused by objectives 51 to be reflected by prisms 52 and 53 forming target images in the comparison plane 54. These images are viewed through an eyepiece 55 by the eye 56 of an observer. According to the invention light from a lamp 57 is reflected by a prism 58 to illuminate a single mark 59 which acts as both adjustment coindicant elements as in Fig. 2. Light from this mark as reflected by the prisms 52 and 53, is collimated by the objectives 51 and is reflected from one viewing point to the other by reflecting surfaces 60 each consisting of a beveled edge on one of the reflectors 50. Zero correction is provided by either adjustment screw 61 operating on either of the mirrors 50. This adjustment is continued until images 65 as seen in the field of view (Fig. 3A) are brought into coincidence. At this time, the range may be read directly by adjusting the coincidence of the object images by means of a light deviator 62.

In Fig. 4, the direct application of the invention to pure autocollimating systems is shown, but it has been found that this particular invention is more useful with the range correction system described in connection with Figs. 1 to 3. Light from an object being ranged is directed by penta prisms 70 through objectives 71 and prisms 72 into focus in a comparison plane 73 which may be viewed through an eyepiece 74. Coincidence of the object images is obtained by adjustment of the light deviator 81. In this embodiment, the adjustment coincidant elements consist of a scale and index illuminated by lamps 75 respectively through prisms 77 and 76. By means of small penta prisms 80 at each viewing point, light from each of these elements makes the round trip through the range finder optical system and is eventually brought to focus to form images 82 and 83 in the comparison plane 73. As the light deviator 81 is adjusted to bring the object images into coincidence, the index image 82 moves along the scale 83 and gives the range directly. Any maladjustment of the instrument which affects the coincidence of the object images, equally affects the setting of the images 82 and 83, and hence, when the object images are in coincidence, the scale reading is automatically correct.

Having thus described the preferred embodiments of my invention, I wish to point out that it is not limited to these structures but is of the scope of the appended claims.

What I claim and desire to secure by Letters Patent of the United States is:

1. A range finder of the type having two spaced viewing points at which light is received from the object being ranged, an optical system for directing and focusing the light to form object images in comparison planes, means for viewing the images and light deviating means for adjusting one of the object images relative to the other, said range finder being characterized by secondary reflector means at each viewing point substantially in the path of the object beams, an adjustment coincidant element at least optically in each plane and means including the secondary reflectors for projecting while ranging and through at least the optical equivalent of the whole of said optical system light from each element to form an image thereof in the other comparison plane whereby the element images cooperate to indicate the adjustment of said system, said light deviating means being outside of both element light beams to deviate only one of the object beams relative to the other.

2. A range finder according to claim 1 and of the stereo type in which the comparison planes are separate and the element images are viewed stereoscopically to give an apparent image distance indicative of said system adjustment.

3. A range finder according to claim 1 and of the coincidence type in which the comparison planes are coplanar and the element images are compared for coincidence.

4. A range finder according to claim 1 and of the stereo type in which the camparison planes are separate, the object images are viewed stereoscopically to give an apparent object distance, the elements are reticle marks and are also viewed stereoscopically adjacent to the object images to give an apparent element distance and the element images are also viewed stereoscopically to give an apparent element image distance whose difference from the apparent element distance is a measure of the maladjustment of said system.

5. A range finder according to claim 1 in which the element images are formed in the comparison planes and are visible through said viewing means.

6. A range finder according to claim 1 in which the elements and the element images are in the comparison planes and the element images are visible through said viewing means.

7. A range finder according to claim 1 and of the stereo type in which the planes are separate, the elements and the element images are all in said planes and are all visible stereoscopically through said viewing means.

8. A range finder of the coincidence type having two spaced viewing points at which light beams are received from the object being ranged, an optical system for directing and focusing the beams in coplanar comparison planes to form object images, means for viewing the images and light deviating means for deviating one of the object beams to adjust the coincidence of the object images, said range finder being characterized by a single range correction setting mark at least optically in the image plane, means for projecting two light beams from the mark respectively out through each half of the optical system to each viewing point, the beams being collimated at the viewing points and being reflected from each viewing point to the other one and back into the other halves respectively of the optical system into focus forming two mark images in the image plane, said light deviating means being outside the path of both mark light beams and an auxiliary light deviator intercepting both mark beams and one of the object beams for adjusting coincidence of the two mark images.

9. A range finder of the coincidence type having two spaced viewing points at which light beams are received from the object being ranged, an optical system for directing and focusing the beams to form object images in a plane constituting coplanar comparison planes, means for viewing the images and light deviating means for deviating one of the object beams to adjust the coincidence of the object images, said range finder being characterized by secondary reflector means at each viewing point substantially in the path of, but not appreciably interfering with, the object beams, a pair of adjustment coincidant elements at least optically in said plane and means including the secondary reflectors for projecting while ranging and through at least the optical equivalent of said optical system in opposite directions, light respectively from the two elements to form images thereof adjacent to each other also in said plane.

10. A range finder according to claim 9 in which said elements are correction setting marks and in which the light deviating means in one object beam, is not in either element beam.

11. A range finder according to claim 9 in which the elements are a scale and an index and said projecting means also includes the light deviating means to deviate both element light beams as well as one of the object light beams.

STEPHEN M. MacNEILLE.